US008755519B2

(12) United States Patent
Benantar

(10) Patent No.: US 8,755,519 B2
(45) Date of Patent: Jun. 17, 2014

(54) LATTICE SCHEME FOR ESTABLISHING A SECURE MULTI-IDENTITY AUTHENTICATION CONTEXT

(75) Inventor: Messaoud Benantar, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 348 days.

(21) Appl. No.: 13/172,387

(22) Filed: Jun. 29, 2011

(65) Prior Publication Data

US 2013/0007453 A1 Jan. 3, 2013

(51) Int. Cl.
*H04L 9/00* (2006.01)
(52) U.S. Cl.
USPC ............. 380/44; 713/168; 713/170; 380/278
(58) Field of Classification Search
None
See application file for complete search history.

(56) References Cited

U.S. PATENT DOCUMENTS

| | | | | |
|---|---|---|---|---|
| 6,684,331 | B1* | 1/2004 | Srivastava | 713/163 |
| 6,901,510 | B1* | 5/2005 | Srivastava | 713/163 |
| 7,221,935 | B2 | 5/2007 | Barriga-Caceres et al. | |
| 7,434,046 | B1* | 10/2008 | Srivastava | 713/163 |
| 7,660,983 | B1* | 2/2010 | Srivastava et al. | 713/163 |
| 7,690,032 | B1 | 3/2010 | Peirce | |
| 2006/0029226 | A1* | 2/2006 | Han et al. | 380/44 |
| 2006/0080352 | A1 | 4/2006 | Boubez et al. | |
| 2008/0184349 | A1 | 7/2008 | Ting | |
| 2011/0035792 | A1 | 2/2011 | Leitner | |

OTHER PUBLICATIONS

E. Bresson, et al. "Provably Authenticated Group Diffie-Hellman Key Exchange—The Dynamic Case," Advances in Cryptology—Proceedings of Asiacrypt 2001 (Dec. 9-13, 2001).*
Li Gong, et al. "A Matrix Key-Distribution Scheme," Journal of Cryptology (1990) 2: 51-59.*
Poursalidis et al, "Towards a person-centric identity management infrastructure (IMI)", International Journal of Computer Systems Science & Engineering, vol. 22, No. 5, Sep. 2007.
Poursalidis et al, "Towards a person-centric identity management infrastructure (IMI)", International Journal of Computer Systems Science & Engineering, vol. 25, No. 1, Jan. 2010.
Sandhu, "Lattice-Based Access Control Models", IEEE, 1993.

(Continued)

*Primary Examiner* — Nadia Khoshnoodi
*Assistant Examiner* — Robert Leung
(74) *Attorney, Agent, or Firm* — Jeffrey S. LaBaw; David H. Judson

(57) ABSTRACT

This disclosure describes a secure and computationally-efficient method to establish a single authentication context for multiple identities. The method is implemented in an authentication system using a key exchange protocol, namely, the Diffie-Hellman key exchange. One or more entities that desire to authenticate (either individually or jointly) register with the authentication system and receive private Diffie-Hellman keys (the PINs). Later, during an authentication operation, each entity provides the PIN to the authentication system, preferably over a secure transport. The authentication system, using Diffie-Hellman key exchange artifacts, generates a Diffie-Hellman cryptographic value for each PIN, although the value need not be maintained private. The authentication system orders the Diffie-Hellman values as a "partially ordered set" to form a lattice. An authentication context is derived from the Diffie-Hellman values in the lattice. Thus, for example, during authentication of multiple entities, a shared key is computed incrementally as the Diffie-Hellman keys arrive from the entities for which a multi-identity authentication is required. The shared key represents a proof of group authentication.

25 Claims, 4 Drawing Sheets

(56) References Cited

OTHER PUBLICATIONS

Zhu et al, "Provably Secure Public-Key Management Protocols for Self-organized Ad Hoc Networks," 2005 IEEE 16th International Symposium on Personal, Indoor and Mobile Radio Communications, 2005.

Dinsmore et al, "Policy-Based Security Management for Large Dynamic Groups: An Overview of the DCCM Project," DARPA Information Survivability Conference & Exposition, 2000.

\* cited by examiner

LATTICE SCHEME FOR ESTABLISHING A SECURE MULTI-IDENTITY AUTHENTICATION CONTEXT

BACKGROUND OF THE INVENTION

1. Technical Field

This disclosure relates generally to entity authentication in computing systems.

2. Background of the Related Art

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard, or a hardware-based token. Some physical characteristic about the user might include a biometric input, such as a fingerprint or a retinal map. It should be noted that a user is typically, but not necessarily, a natural person; a user could be a machine, a computing device, or other type of data processing system that uses a computational resource. Also, a user typically but not necessarily possesses a single unique identifier; in some scenarios, multiple unique identifiers may be associated with a single user.

User authentication is one function that service providers offer to ensure that users accessing resources (e.g., applications, web content, etc.) are authorized to do so. To ensure that a user is not an imposter, service providers implement authentication systems, typically as server-based applications. In a typical use case, an authentication system asks for a user's username and password to prove identity before authorizing access to resources. Single sign-on (SSO) is a more sophisticated authentication system that includes an access control mechanism which enables a user to authenticate once (e.g., provide a username and password) and gain access to software resources across multiple systems. Typically, an SSO system enables user access to resources within an enterprise or an organization. Federated Single Sign-on (F-SSO) extends the concept of single sign-on across multiple enterprises, thus establishing partnerships between different organizations and enterprises. F-SSO systems typically include application level protocols that allow one enterprise (e.g., an identity provider) to supply a user's identity and other attributes to another enterprise (e.g., a service provider).

Traditionally, an authentication "context" is established for a single entity (e.g., one user, one programming agent) presenting its secret(s) to an authentication system. The resulting authentication context carries with it a single identity.

In many business scenarios, however, the need arises for an authenticated context representing two or more identities. One example is a business process wherein approval of a process step requires the collaboration of several actors or entities. Another example might arise in the context of the information technology (IT) delivery model known as "cloud computing," by which shared resources, software and information are provided on-demand over the Internet to computers and other devices. In a typical cloud approach of this type, an application instance is hosted for a tenant in a provider's compute cloud. A multi-identity authenticated context in this example would be one in which it is desired to modify a tenant's sensitive data, but only with the cooperative approval of both the tenant and an authorized cloud service provider administrator. A useful analogy is a safe deposit box at a bank, wherein a customer's key, as well as the bank's key, is required to unlock the box.

There is a need in the art to provide for efficient, yet secure techniques to establish a single authentication context for multiple identities to facilitate these and other use scenarios. This disclosure addresses this need.

BRIEF SUMMARY

This disclosure describes a secure and computationally-efficient method to establish a single authentication context for multiple identities. The method is implemented in an authentication system using a key exchange protocol, namely, the Diffie-Hellman key exchange. One or more entities that desire to authenticate (either individually or jointly) register with the authentication system and receive private Diffie-Hellman keys (the PINs). Later, during an authentication operation, each entity provides the PIN to the authentication system, preferably over a secure transport. The authentication system, using Diffie-Hellman key exchange artifacts, generates a Diffie-Hellman cryptographic value for each PIN, although the value need not be maintained private. The authentication system orders the Diffie-Hellman cryptographic values as a "partially ordered set" to form a lattice. An authentication context for one or more entities is derived from the Diffie-Hellman values in the lattice.

According to another aspect, a method of access control requiring cooperation by at least first and second entities is implemented by an authentication system. The method begins by receiving, from each of the first and second entities, a unique key (a PIN) generated according to Diffie-Hellman. The keys are ordered in a lattice as a partially ordered set. Upon receipt of an authentication request, a shared key is generated from the unique keys. The shared key, which acts as a proof of group authentication, is then used to facilitate an access control operation. The authentication scheme can be generalized to multiple entities, each of which has an associated unique Diffie-Hellman key (PIN). In a variant, the shared key is computed incrementally.

In an alternative embodiment, a method such as described above is performed in an apparatus comprising a processor, and computer memory holding computer program instructions that when executed by the processor perform the method.

In another alternative embodiment, a method such as described above is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
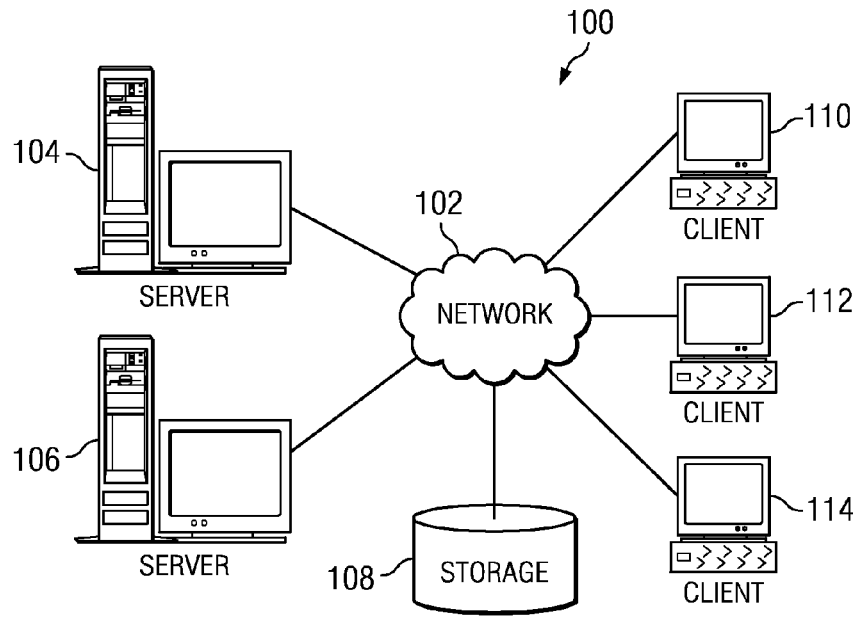
FIG. 1 depicts an exemplary block diagram of a distributed data processing environment in which exemplary aspects of the illustrative embodiments may be implemented.
Figure 2:
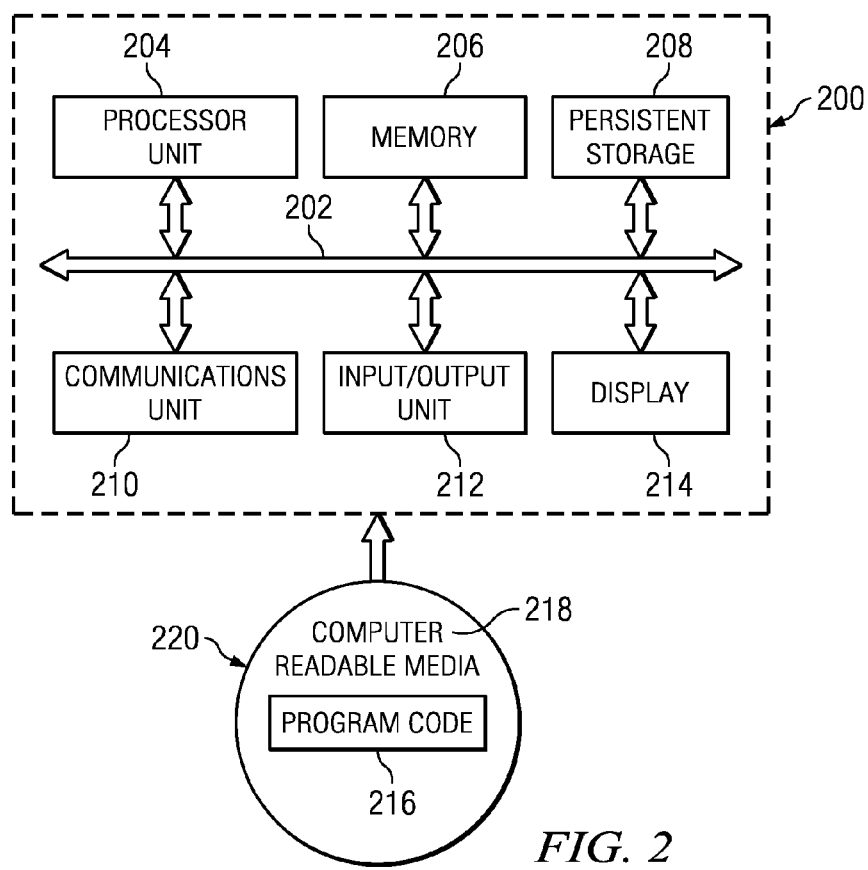
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The standard client-server paradigm such as illustrated in FIG. 1 is one in which client machines communicate with an Internet-accessible Web-based portal executing on a set of one or more machines. In particular, end-users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
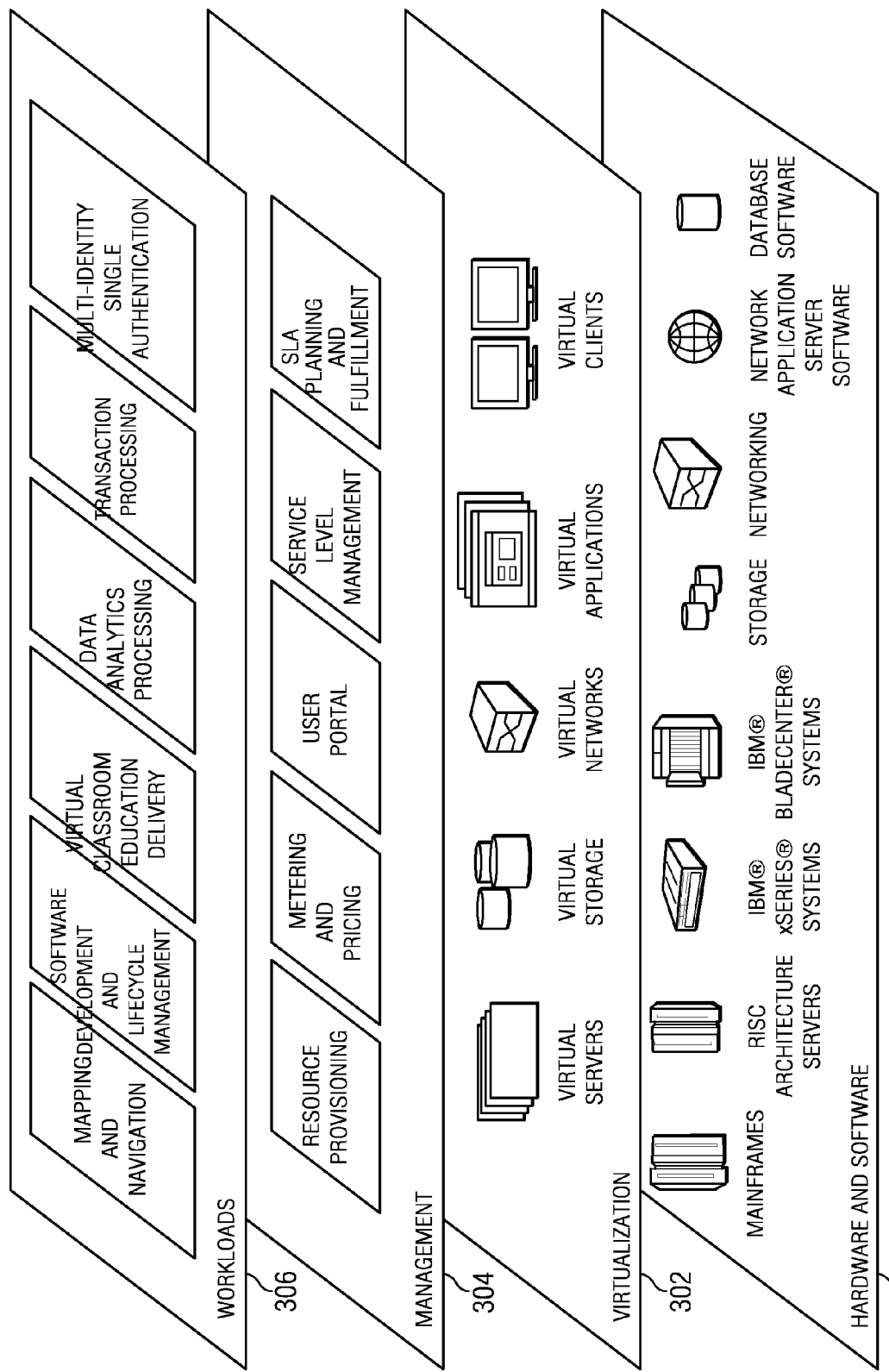
FIG. 3 depicts abstraction model layers of a cloud compute environment in which the disclosed authentication scheme may be implemented according to an embodiment of the invention.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, multi-identity single authentication.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

Diffie-Hellman Key Exchange

The general authentication scheme disclosed herein takes advantage of a known key exchange protocol called the Diffie-Hellman (D-H) key exchange. Thus, by way of background, the following provides details regarding this known cryptographic technique.

In the basic D-H scheme, two entities A and B communicate over a public or a private network to generate a shared secret without having to exchange any secrets. The basic algorithm works as follows, using generator g, and modulus prime number p. Entity A generates a private value a, and entity B generates a private value b. Each entity then derives a public Diffie-Hellman value using parameters p and g, together with their respective private values. Entity A's public value is $g^a$ mod p, and Entity B's public value is $g^b$ mod p. Entities A and B then exchange their public values. Entity A, having received $g^b$ mod p from B, computes $(g^b)^a$ mod p; Entity B, having received $g^a$ mod p from A, computes $(g^a)^b$ mod p. As can be seen, the computed values are equal to one another, and they represent a shared key. The shared key is a secret. The Diffie-Hellman scheme as described generalizes to more than two entities.

Secure Multi-Identity Single Authentication Context

According to this disclosure, the above-described Diffie-Hellman key exchange is adapted to facilitate creation of a multi-identity authentication context.

Figure 4:
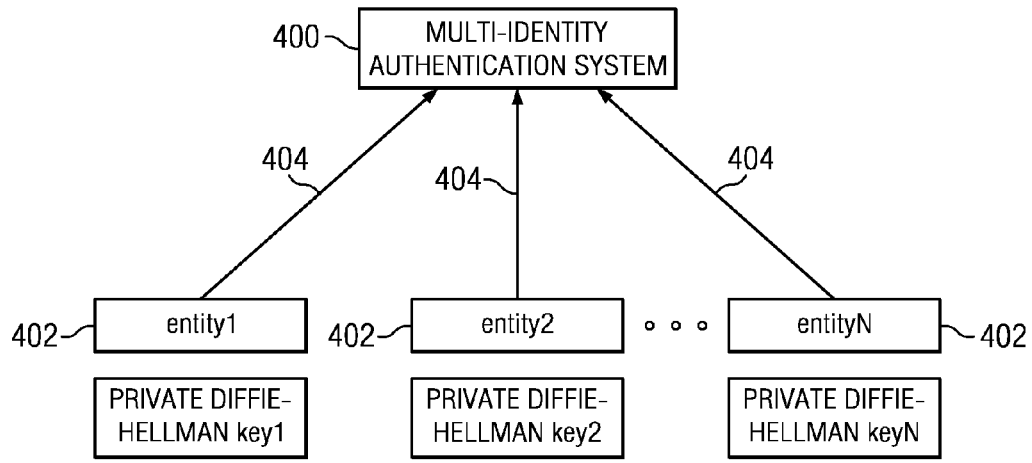
FIG. 4 is an exemplary block diagram illustrating an authentication system of this disclosure.

FIG. 4 illustrates the basic use scenario. In this example, an authentication system 400 establishes a single authentication context for a set of "n" entities 402, where "n" is one or more. As used herein, an "entity" should be broadly construed to refer to a person (or user), a programming agent, a program or process (associated with a person or automated entity), a machine, a device, or any other computational entity, that seeks to authenticate to a computing system for a purpose. The purpose may be quite varied but, typically, authentication is carried out to establish that the entity is permitted to take some action, such as access to a resource, with respect to the computing system. The particular purpose for which an entity seeks to access the computing system is not an aspect of this disclosure, as authentication, authorization and access control are well-developed art. Moreover, the authentication system in which the disclosed scheme is implemented may be used for any application environment including, without limitation, authentication within a single computing system, single sign-on, federated sign-on, cloud-based authentication, or the like. Authentication system 400 may be implemented as part of, or as adjunct to, another system (e.g., an authorization system, an access control system, a security policy system, an audit system, or the like), and it may be implemented as a product or a service. It may be implemented at a local or remote computing system, or in a local or distributed manner. With reference to FIG. 4, a typical operating constraint is that an entity 402 communicates with the authentication system 400 over a secure transport channel 404. In a representative embodiment, the transport channel 404 is a data channel secured via known techniques, such as SSL or TLS, by a VPN or private network, or the like. Generalizing, the transport channel may be based on any communication protocols that implement the ISO/OSI Physical and Data Link layers (Layers 1 & 2) upon which a traditional networking stack is built.

According to this disclosure, the Diffie-Hellman scheme is used in a unique way to enable the authentication system 400 to derive a single authentication value establishing a group of identities by a single construct. This single secret is sometimes referred to herein as a "single authentication context" and, as will be seen, the single authentication context is established for one or more entities. When the single authentication context is established for two or more entities, which is the typical use case, it is sometimes referred to herein as a "multi-identity single authentication context."

The authentication system 400 may be implemented as a machine, a device, a program, a process, or any other computational entity. Typically, the authentication system is implemented as software (a set of program instructions) executed on one or more processors. A representative, but non-limiting, implementation is the IBM Tivoli Federated Identity Manager (TFIM), as modified to provide the authentication scheme that is now described.

Figure 5:
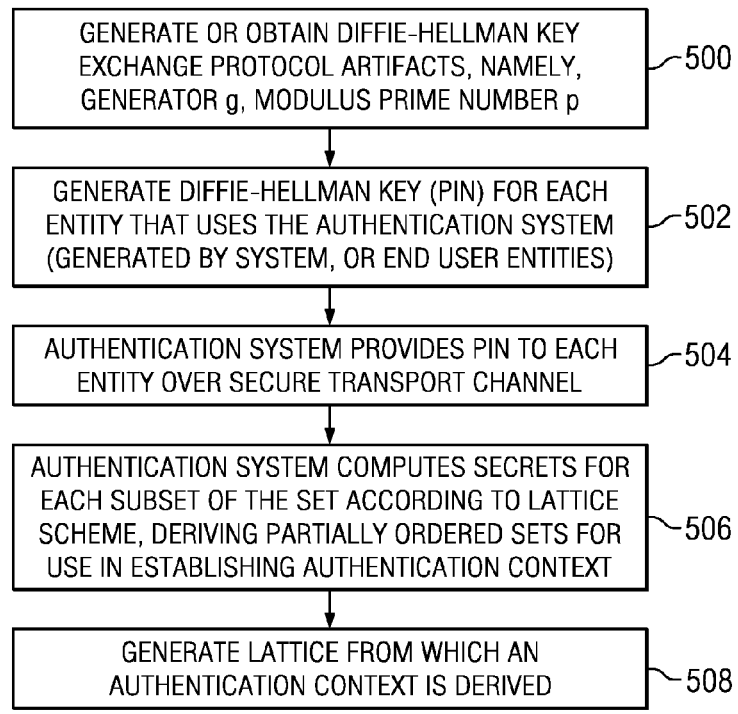
FIG. 5 illustrates a process flow diagram illustrating the authentication scheme of this disclosure.

FIG. 5 is a process flow diagram illustrating how an authentication system generates the single authentication context according to this disclosure. The routine begins at step 500 with the generation of Diffie-Hellman artifacts, namely, a generator g, and a modulus p. These artifacts are generated in a known manner. Thus, for example, g is a generator for a cyclic group, and typically it is public. In the alternative, one or more of these artifacts may be received by the authentication system from another source that generates them. At step 502, and using the artifacts, the authentication system generates private Diffie-Hellman keys for each user (or set of users)

joining a "Set." Each such private Diffie-Hellman key is sometimes referred to herein as the user's (or group of users') personal identification number or "PIN." Thus, for example, user x obtains PIN a, user y obtains PIN b, and so forth. Step 502 may occur during a registration process of the user to the authentication system, or at some other time. At step 504, the PIN for a user is sent from the authentication system to the user, preferably over the secure transport channel. In an alternative embodiment, the user/agent generates the private PIN and provides it to the authentication system. In either case, the user does not need to know the generator or the modulus, which artifacts are known to the authentication system. The authentication system 400 may (but need not) store the PIN for each user (or group of users). If the PIN values are not stored, then the authentication system must be provided these values during a subsequent authentication operation, as will be described below with respect to the embodiment in FIG. 7. Steps 502 and 504 are carried out for each user (or group of users), concurrently, sequentially, or as such user (or group of users) elects to join the Set. The Set refers to the users for which the authentication context is to be generated. The Set, as will be seen, is dynamic in the sense that the number of users (or group of users) that comprise the Set can vary dynamically as users join or leave the Set.

At step 506, the authentication system computes cryptographic values to establish a collective "Subset" of users as a single entity. The cryptographic values are used to establish the authentication context, as will be seen. As used herein, a Subset of the Set may comprise just one user (or group of users). A representative Set has three users, such as x, y and z, and each user (or group) has a respective PIN a, b and c (as generated in step 502). Thus, given user set S {x, y, z}, and given their respective PIN numbers a, b and c, the step 506 calculates the following cryptographic values for use in establishing the authentication context:

$g^a$ mod p for user x (can be used to authenticate single user x)
$g^b$ mod p for user y (can be used to authenticate single user y)
$g^c$ mod p for user z (can be used to authenticate single user z)
$g^{ab}$ mod p (to authenticate users x and y as a single entity (group))
$g^{ac}$ mod p (to authenticate users x and z as a single entity)
$g^{bc}$ mod p (to authenticate users y and z as a single entity)
$g^{abs}$ mod p (to authenticate users x, y and z as a single entity)

Note that this scheme generalizes nicely, because even a "group" containing just a single user (e.g., user x with PIN "a" corresponding to cryptographic value $g^a$ mod p) is authenticated using the same scheme. Another advantage is that, unlike traditional Diffie-Hellman (in which the generated secret must remain private), the cryptographic value as generated in step 506 can become public without creating a security exposure. This is because it is difficult to compute the exponent value for discrete logarithms. In other words, although step 506 generates cryptographic values for each Subset, these values can become public without risk.

Step 506 may occur during a registration process, during a logon, or at another time, such as when a new user acquires (or generates) the PIN from which the secret (for that user) is generated.

Figure 6:
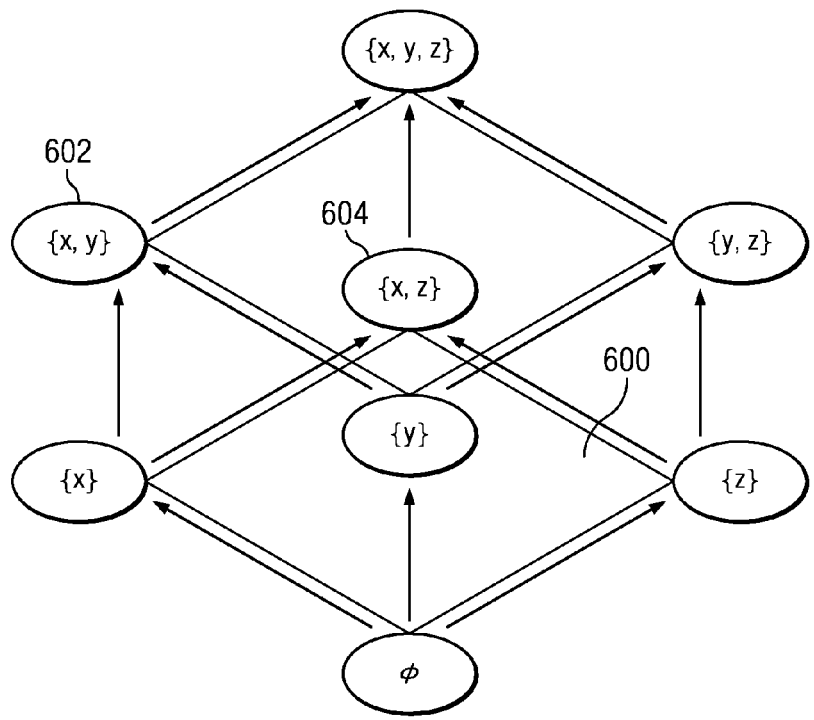
FIG. 6 illustrates a lattice that represents a set of secrets that are generated and used by the authentication system to create the multi-identity authentication context of this disclosure.

Conveniently, the above-identified cryptographic values generated by the authentication system and used to establish the authentication context comprise lattice 600, such as shown in FIG. 6. As used herein, a "lattice" refers to a known mathematical construct that provides a way to formalize the ordering of objects using a concept known as a partially ordered set. A partially ordered set is a set (a finite or infinite set of objects) taken together with a "partial order." Formally, a partially ordered set is defined as an ordered pair P=(X, ≤), where X is called a ground set of P and ≤ is the partial order of P. An element j in a partially ordered set said to be an upper bound for a subset S of X if for every s≡S, s≤j. Similarly, a lower bound for a subset S is an element n such that for every s≡S, n≤s. A lattice as an algebra is equivalent to a lattice as a partially ordered set. Certain inequalities hold for any lattice.

Preferably, the authentication system generates and maintains (in memory) a representation of the lattice in the form of a data array, a linked list, or some other internal data structure. As illustrated, the lattice 600 is a three (3)-dimensional mathematical construct formed by the partially-ordered Subsets of Set {x, y, z}. This number of users is merely exemplary, and the representative varies accordingly as the number increases or decreases. As used herein, a lattice "member" corresponds to a user or group of users, and it is represented at a vertex point. Moreover, each Lattice member has an associated cryptographic value represented by one of the values above (as generated at step 506). The associated cryptographic value for a particular Lattice member is sometimes referred to as a "password," and, depending on the circumstance, the password may also be the authentication context.

In particular, if the Lattice member is the group corresponding to user x and user y (vertex 602, in FIG. 6), then the corresponding password $g^{ab}$ mod p is the authentication context for this group. In other words, and to provide a more concrete example, if user x and user y desire to come together to approve a process step (in a business process), the authentication context for the combined entity (user x together with user y) is represented by the password. As another example, assume user x has not yet joined the Set but his or her involvement is required before the group comprising user x and user z can perform a given action. In a concrete example, user x is a cloud service provider administrator, user z is the cloud tenant, and the desired action is access to the tenant's sensitive data. In this example, each of user x and user z has a password (as each is a Lattice member) but the authentication context is not created (for (x, z)) until the value $g^{ac}$ mod p is formed (vertex 604, in FIG. 6).

Thus, a lattice member (which represents one or more users) has an associated a password, and the password may (depending on the circumstances) comprise an authentication context, and possible a multi-identity authentication context. When a multi-identity authentication context is established, the resulting password is sometimes referred to herein as a "shared key." The shared key is a proof of group authentication. Step 508 represents the formation of the lattice from which the authentication context is derived. As noted above, the authentication context is the cryptographic value (or passwords) associated with one of the lattice points.

As noted above, steps 502, 504 and 506 in FIG. 5 occur at any time with respect to the participating users in the Set. Step 508, the generation of the Lattice, is a continuous process, as one or more users may join or leave a group. Thus, for example, assume that a particular group comprises users y and z. The associated Lattice member secret is $g^{bc}$ mod p. Now, assume that user x joins the group. When the user {x} joins users {y, z}, the password for the new group of users {x, y, z} is automatically determined by the supremum {x} ∨ {y, z} of the Lattice. In particular, and according to lattice theory, given a subset S of a partially-ordered set T, the supremum (sup) of S, if it exists, is the least element of T that is greater than or equal to each element of S. In other words, (sup) is equal to a least upper bound (LUB). Similarly, when a user leaves a group, the new password for the remaining users is the Subset without the user's that is leaving the group.

Figure 7:
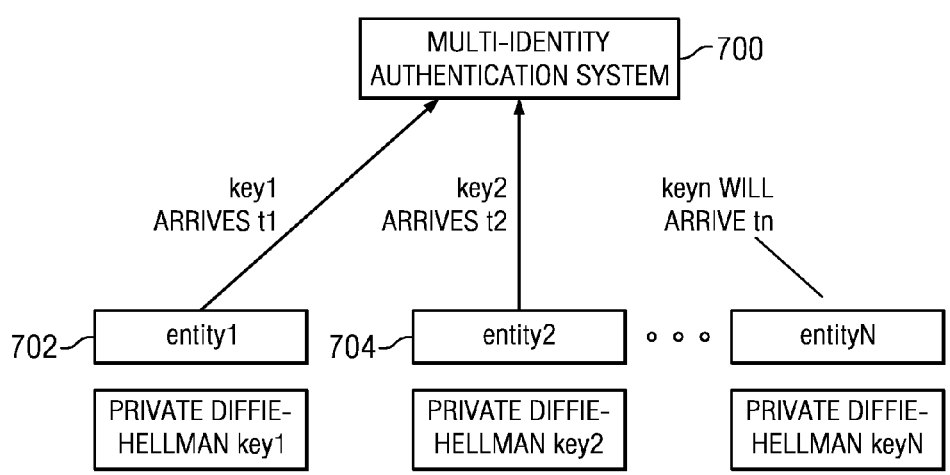
FIG. 7 illustrates an authentication operation during which a shared key is computed incrementally.

During authentication of multiple parties, a shared key may be computed, incrementally, if the private Diffie-Hellman keys (the PINs) arrive at the authentication system at different times. This is illustrated in FIG. 7. In this example, private Diffie-Hellman keys (the PINs) arrive (at the authentication system 700) from the one or more participating entities, but at different times (and from different locations). Thus, $key_1$ from entity 702 arrives at system 700 at time $t_1$, $key_2$ from entity 704 arrives at system 700 at time $t_2$, and $key_n$ will arrive at the system at time $t_n$. In this manner, the authentication context evolves as the lattice values are computed (and the lattice, in effect, is reconstituted). Although FIG. 7 illustrates entities joining the Set, this is not a limitation, as the lattice reforms as one or more entities leave the Set, as has been described. The particular shared key that results will depend on the participating entities that comprise the Set at the given time the shared key is computed (derived from the lattice). As noted above, the shared key is the single authentication context (i.e., the proof of group authentication). As required, the shared key is verified by the system to facilitate an operation desired to be undertaken by the multiple entities acting cooperatively.

Thus, according to this disclosure, multiple entities register with the authentication system and receive private Diffie-Hellman keys (the PINs). (As noted above, in the alternative, one or more entities derive the PIN and provide it to the authentication system). The authentication system, using the generator and the modulus, generates the one or more cryptographic values, although these values need not be maintained private. During logon, each entity presents its private D-H key (the PIN) to the authentication system, preferably over a secure transport. During authentication, the authentication system computes the shared key (incrementally, if need be) as the D-H keys arrive from the participating entities. (If all of the keys are already available, incremental processing is not required). Once the shared key (the single authentication context) has been identified and verified, a desired collaborative operation is undertaken.

The described subject matter has numerous advantages. The technique provides a secure method for establishing a single security context for multiple identities. Each identity may be separately established, and each identity may represent completely different users, programming agents, or the like. The technique also is computationally-efficient at least in part because the Diffie-Hellman key exchange protocol is readily-implemented. An authentication system that implements the technique orders the D-H secrets generated from the individual D-H keys (received from the one or more participating entities) as a partially-ordered set. Each member of the resulting lattice corresponds to a unique group of users that can be authenticated.

The scheme exhibits strong authentication, because computing the password or the PIN knowing either of them is computationally hard, as the inverse of a discrete logarithm is difficult to compute. The scheme generalizes to any number of users based on the lattice structure, and the passwords are easily generated as users join or leave a group. The passwords maintained by the authentication system no longer need to be kept private—indeed, they may be public values—once again, because of the difficulty of computing the inverse of the discrete logarithm.

The technique is easy to use because the key values described by the lattice are not exchanged; rather, they are maintained by the authentication service. No individual user (or any subset of users) arrives to the final key (password or PIN number). The keys computed as such are used to authenticate to the authentication service each desired subset of the lattice members, irrespective of the number of individuals involved. An individual leaving a set of users automatically renders that set of users to a lower element of the lattice. Moreover, there is no shared key across the individual subgroup members (i.e., across each lattice member).

While the technique has been described in the context of the Diffie-Hellman key exchange, which is the preferred technique, any key exchange by which participants can generate a shared secret without having to exchange secrets may be substituted. Alternative algorithms may include, without limitation, an elliptic curve variant to Diffie-Hellman, the MQV key exchange protocol (both RSA and ECC-based) and its variants (e.g., HMQV and FHMQV), and others.

The authentication system functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The single authentication context establishment scheme described herein may be implemented in or in conjunction with various server-side architectures other than cloud-based infrastructures. These include, without limitation, simple n-tier architectures, web portals, federated systems, and the like.

As the above examples illustrate, one or more of the authentication system functions may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the identity provider instance discovery functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the components that establish the authentication context are implemented in a special purpose computer, preferably in software executed by one or more processors. Associated data for use therein is stored in an associated data store. The software also is maintained in one or more data stores or memories associated with the one or more processors, and the software may be implemented as one or more computer programs.

The functionality described herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described the invention, what I now claim is as follows.

The invention claimed is:

1. A method of authentication, comprising:
receiving, from each of one or more entities, a unique key value generated according to a key exchange protocol;
ordering the unique key values in a lattice as a partially ordered set, each vertex of the lattice having an associated key corresponding to a unique group of the one or more entities and derived from the unique key values of the one or more entities in the unique group;
responsive to an authentication request, the authentication request associated with an operation by a group of entities, obtaining a key from the lattice, the key representing a single authentication context for the group of entities; and
performing an authentication using the key obtained from the lattice to enable the operation by the group of entities;
wherein at least one of the obtaining and performing steps is carried out in software executing in a hardware element.

2. The method as described in claim 1 wherein the key exchange protocol is Diffie-Hellman.

3. The method as described in claim 1 wherein the unique key values are associated with first and second entities that are authenticated as a joint entity.

4. The method as described in claim 3 wherein the operation is a collaboration operation by the first and second entities acting jointly.

5. The method as described in claim 1 wherein the unique key values are received securely.

6. The method as described in claim 1 wherein at least first and second unique key values are received from first and second entities at different times.

7. The method as described in claim 6 wherein the key obtained from the lattice is computed incrementally as the first and second unique key values are received.

8. An apparatus, comprising:
a processor;
computer memory holding computer program instructions that when executed by the processor perform a method comprising:
receiving, from each of one or more entities, a unique key value generated according to a key exchange protocol;
ordering the unique key values in a lattice as a partially ordered set, each vertex of the lattice having an associated key corresponding to a unique group of the one or more entities and derived from the unique key values of the one or more entities in the unique group;
responsive to an authentication request, the authentication request associated with an operation by a group of entities, obtaining a key from the lattice, the key representing a single authentication context for the group of entities; and
performing an authentication using the key obtained from the lattice to enable the operation by the group of entities.

9. The apparatus as described in claim 8 wherein the key exchange protocol is Diffie-Hellman.

10. The apparatus as described in claim 8 wherein the unique key values are associated with first and second entities that are authenticated as a joint entity.

11. The apparatus as described in claim 10 wherein the operation is a collaboration operation by the first and second entities acting jointly.

12. The apparatus as described in claim 8 wherein the unique key values are received securely.

13. The apparatus as described in claim 8 wherein at least first and second unique key values are received from first and second entities at different times.

14. The apparatus as described in claim 13 wherein the key obtained from the lattice is computed incrementally as the first and second unique key values are received.

15. A computer program product in a non-transitory computer readable medium for use in a data processing system, the computer program product holding computer program instructions which, when executed by the data processing system, perform a method comprising:
  receiving, from each of one or more entities, a unique key value generated according to a key exchange protocol;
  ordering the unique key values in a lattice as a partially ordered set, each vertex of the lattice having an associated key corresponding to a unique group of the one or more entities and derived from the unique key values of the one or more entities in the unique group;
  responsive to an authentication request, the authentication request associated with an operation by a group of entities, obtaining a key from the lattice, the key representing a single authentication context for the group of entities; and
  performing an authentication using the key obtained from the lattice to enable the operation by the group of entities.

16. The computer program product as described in claim 15 wherein the key exchange protocol is Diffie-Hellman.

17. The computer program product as described in claim 15 wherein the unique key values are associated with first and second entities that are authenticated as a joint entity.

18. The computer program product as described in claim 17 wherein the operation is a collaboration operation by the first and second entities acting jointly.

19. The computer program product as described in claim 15 wherein the unique key values are received securely.

20. The computer program product as described in claim 15 wherein at least first and second unique key values are received from first and second entities at different times.

21. The computer program product as described in claim 20 wherein the key obtained from the lattice is computed incrementally as the first and second unique key values are received.

22. An authentication system, comprising:
  a processor;
  computer memory holding computer program instructions executed by the processor (i) generating a unique Diffie-Hellman key for each of one or more entities, (ii) providing the unique Diffie-Hellman key to a respective entity, (iii) during an authentication operation, receiving Diffie-Hellman keys from multiple entities and ordering the unique key values in a lattice as a partially ordered set, each vertex of the lattice having an associated key corresponding to a unique group of the one or more entities and derived from the unique key values of the one or more entities in the unique group, and (iv) using a key obtained from the lattice as a proof of authentication to authenticate the multiple entities as a single joint entity.

23. The authentication system as described in claim 22 wherein the key is derived from the lattice from partially ordered subsets of the Diffie-Hellman keys.

24. The authentication system as described in claim 23 wherein the Diffie-Hellman keys are received during the authentication operation incrementally.

25. The authentication system as described in claim 23 wherein the partially ordered subsets of the Diffie-Hellman keys vary over time.

* * * * *